(12) United States Patent
Lambiaso

(10) Patent No.: US 6,563,047 B2
(45) Date of Patent: May 13, 2003

(54) AIRCRAFT JUNCTION BOX

(75) Inventor: Guy A. Lambiaso, Garden Grove, CA (US)

(73) Assignee: The Boeing Co., Chicago, IL (US)

( * ) Notice: Subject to any disclaimer, the term of this patent is extended or adjusted under 35 U.S.C. 154(b) by 0 days.

(21) Appl. No.: 09/944,973

(22) Filed: Aug. 31, 2001

(65) Prior Publication Data

US 2003/0042036 A1 Mar. 6, 2003

(51) Int. Cl.$^7$ .................................................. H01J 5/00
(52) U.S. Cl. ........................... 174/50; 174/50; 174/60; 174/66; 220/4.02; 220/241; 248/906
(58) Field of Search .......................... 174/48, 50, 58, 174/60, 63, 17 R, 66, 67, 93, 17 CT, 135, 35 GC, 65 R; 220/3.6, 3.8, 4.02, 241, 242; 248/906; 435/535; 363/600

(56) References Cited

U.S. PATENT DOCUMENTS

| | | | | |
|---|---|---|---|---|
| 3,864,511 A | * | 2/1975 | Morby et al. | 174/58 |
| 4,373,776 A | * | 2/1983 | Purdy | 385/135 |
| 4,449,015 A | * | 5/1984 | Hotchkiss et al. | 174/66 X |
| 5,726,385 A | * | 3/1998 | Lowery et al. | 174/50 |
| 5,906,287 A | * | 5/1999 | Kohnen | 220/3.2 |
| 6,066,803 A | * | 5/2000 | Hagarty | 174/50 |
| 6,229,087 B1 | * | 5/2001 | Archer | 174/50 |
| 6,278,058 B1 | * | 8/2001 | Anderson | 174/50 |
| 6,375,487 B1 | * | 4/2002 | Tennessen | 439/373 |

* cited by examiner

Primary Examiner—Anthony Dinkins
Assistant Examiner—Dhiru R Patel
(74) Attorney, Agent, or Firm—Harness Dickey & Pierce P.L.C.

(57) ABSTRACT

A junction box for an aircraft that provides a convenient and secure device for routing electrical cables through a passenger compartment floor panel of an aircraft. The junction box includes an enclosure that attaches to a bottom surface of the floor panel of the aircraft, and a cover, cable strain support, and gasket, that attach to a top surface of the floor panel. The walls of the enclosure can accommodate various shaped cutouts depending on the type of cable connectors being used with the cables. A portion of the cover is offset from the rest of the cover to provide an access opening for routing cables into the passenger compartment of the aircraft.

12 Claims, 4 Drawing Sheets

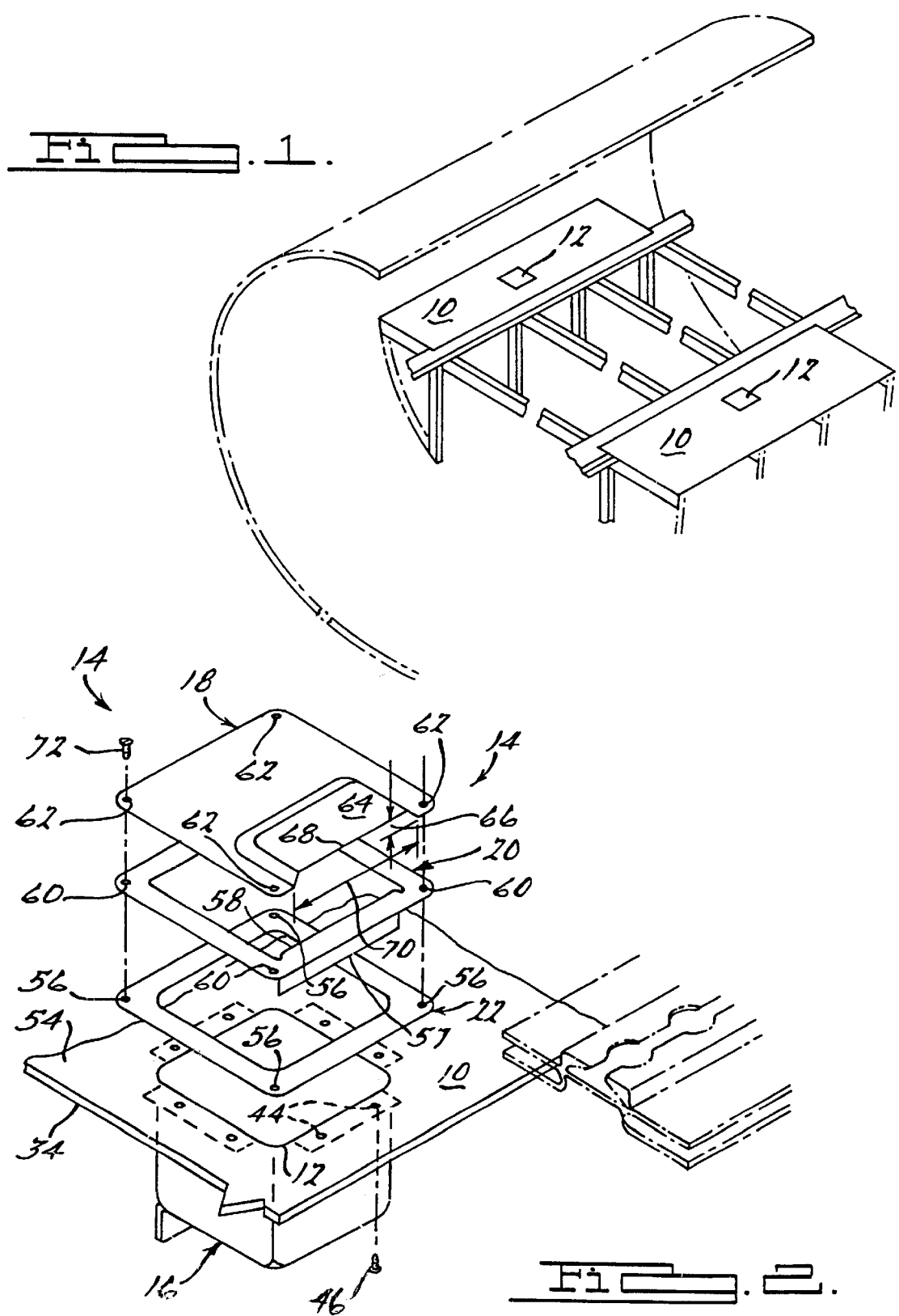

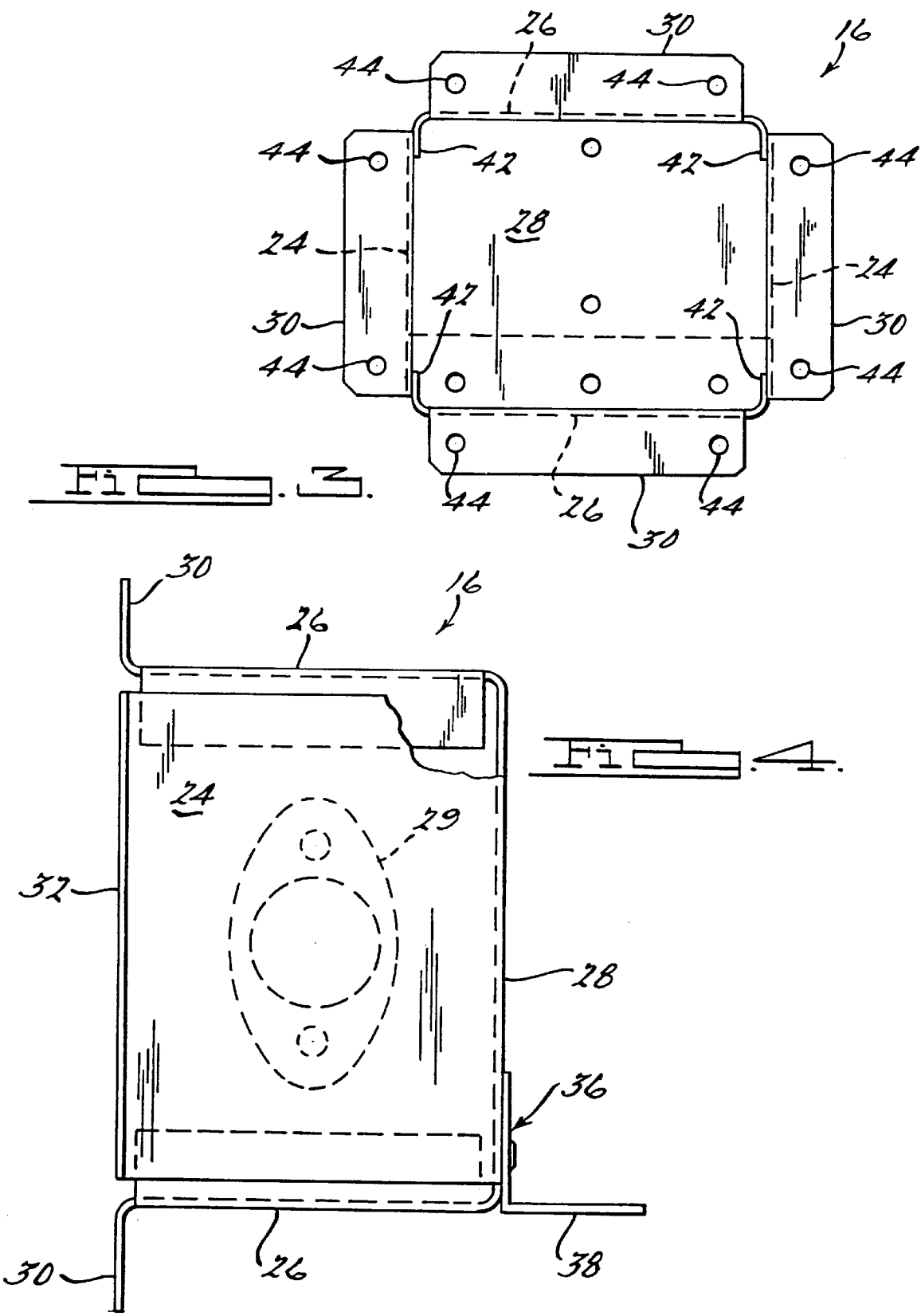

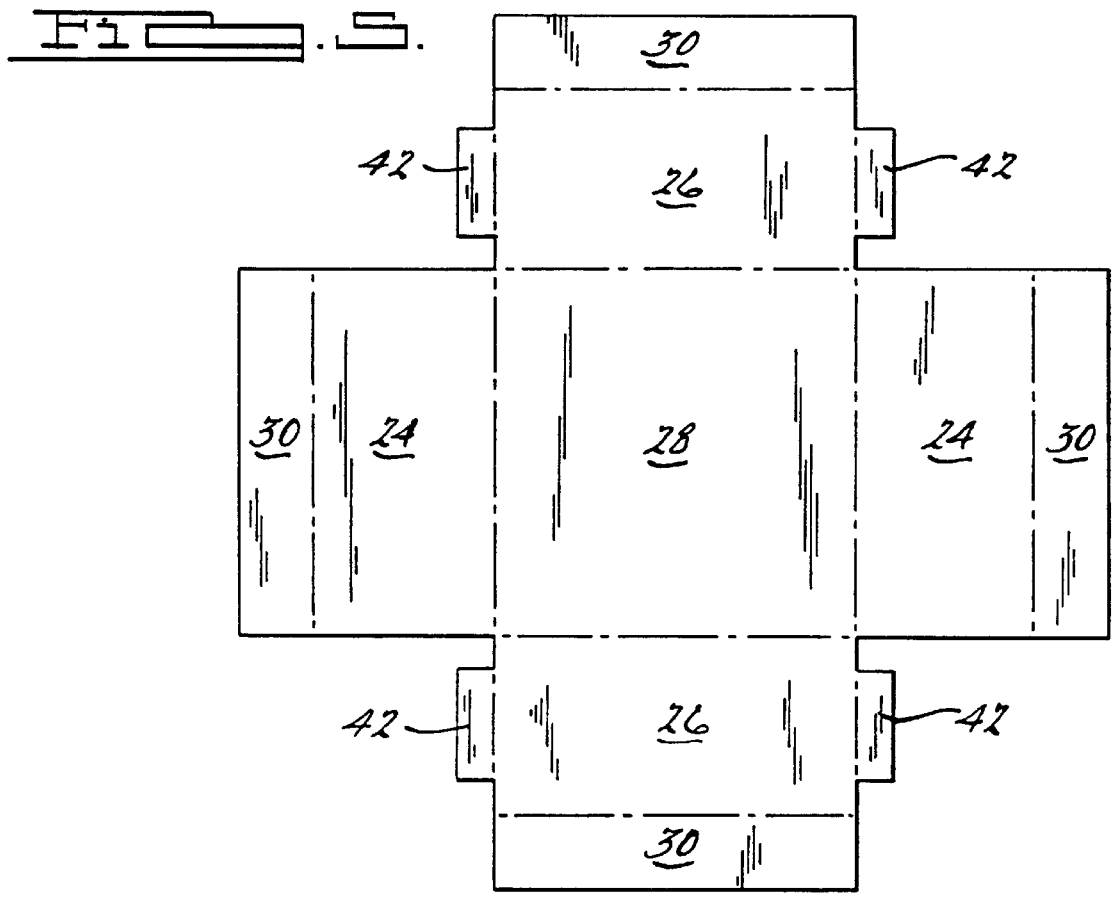
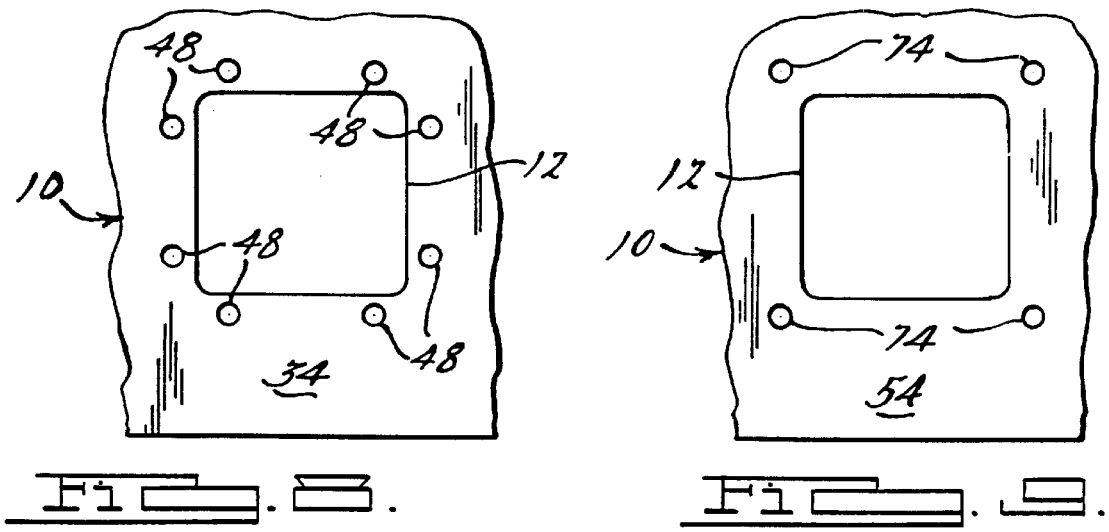

AIRCRAFT JUNCTION BOX

FIELD OF THE INVENTION

The present invention relates in general to junction boxes, and more particularly, to a junction box specifically adapted for use in an aircraft that enables electrical cables to be easily routed through a passenger compartment floor of the aircraft.

BACKGROUND OF THE INVENTION

Commercial passenger airlines typically have multiple rows of passenger seats that are arranged in columns separated by one or more aisles. There are occasions when it is necessary to run electrical cables to the passenger seats in order to provide the passengers access to various services, such as telecommunications, lighting, audio sound, etc. On aircraft that have the passenger seats arranged in two columns separated by a single aisle, the wiring typically enters the passenger compartment through openings located along the passenger compartment walls. Larger wide body aircraft, however, typically have multiple columns of seats separated by multiple aisles. In such aircraft it is difficult to effectively route the cables from the walls of the passenger compartment to the passenger seats located near the center of the aircraft because of the intervening aisle. One alternative would be to route the wiring through the floor of the passenger compartment rather than the walls. Accordingly, it would be desirable to provide a convenient and secure means for routing the electrical wiring through the passenger compartment floor on those aircraft that have more than one aisle separating the passenger seats.

SUMMARY OF THE INVENTION

In accordance with the present invention, a preferred embodiment of a passenger compartment floor mounted junction box is disclosed. The junction box consists of a generally box shaped enclosure that attaches to the underside of the passenger compartment floor. A cutout in the passenger floor provides access to the enclosure from the passenger compartment. Multiple cutouts can be manufactured into the sides of the enclosure to accommodate various cable connector configurations depending on the particular application. The junction box is substantially sealed off from the passenger compartment by means of a cover that attaches to the passenger compartment side of the floor. The cover has a raised section along one of its edges so that the cables can be routed out of the junction box and into the passenger compartment. The present invention also provides for a cable strain support for securing the cables to the junction box and a gasket to minimize the possibility of contaminants entering the junction box.

Further areas of applicability of the present invention will become apparent from the detailed description provided hereinafter. It should be understood that the detailed description and specific examples, while indicating a preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a portion of a passenger compartment floor panel within a fuselage of an aircraft, wherein the floor panel has multiple access openings;

FIG. 2 is an exploded perspective view of a junction-box of the present invention;

FIG. 3 is a plan view of the junction box enclosure (i.e., as viewed from within the passenger compartment looking down);

FIG. 4 is a side view of the junction box enclosure shown in FIG. 3;

FIG. 5 is a plan view of the section of material used to form the junction box enclosure shown in FIGS. 3 and 4, before being formed into a box shape;

FIG. 8 shows a preferred location of the threaded inserts used to attach the enclosure to the bottom of the floor panel; and FIG. 9 shows a preferred location of the threaded inserts used to attach the cover, cable strain support and gasket to the top of the floor panel.

DETAILED DESCRIPTION OF THE PREFERRED EMBODIMENTS

Figure 6:
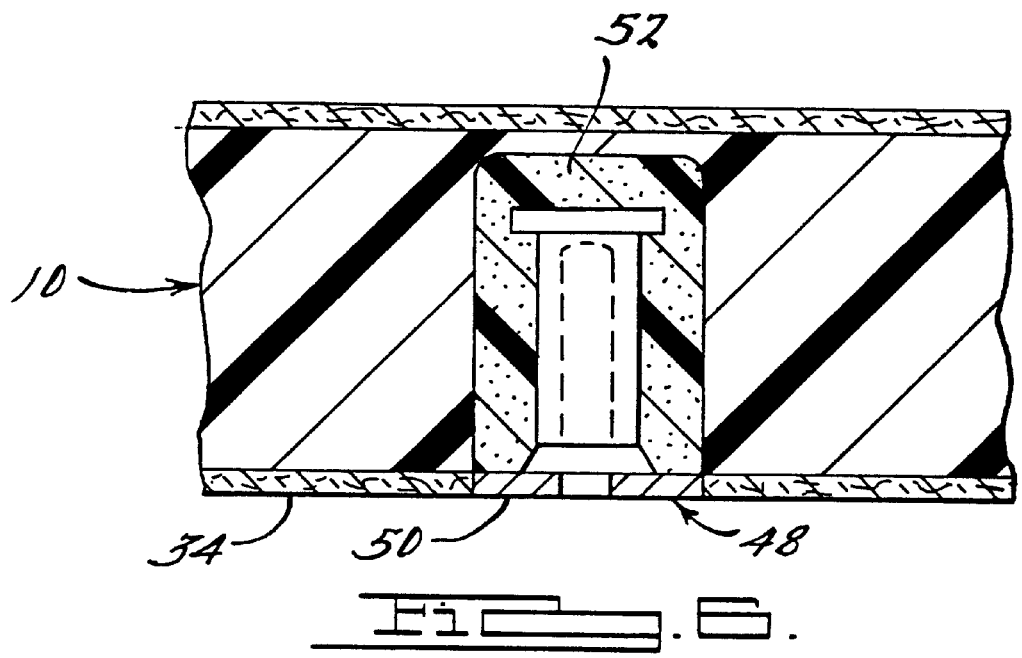
FIG. 6 is a cross section of a portion of the passenger compartment floor panel showing a threaded insert used to attach the enclosure to the bottom of the floor panel.

The following description of the preferred embodiment(s) is merely exemplary in nature and is in no way intended to limit the invention, its application, or uses.

Referring to FIG. 1, there is shown a passenger compartment floor panel 10 having multiple openings 12 that are generally rectangular in shape. The openings 12 provide a means for routing cables (not shown) through the floor panel 10 and into a passenger compartment of an aircraft. The number and the location of the openings 12 will vary depending on the requirements of the particular installation. While the opening 12 is preferably rectangular in shape, the skilled artisan will recognize that other shapes are possible, and that the actual shape will depend in large part on the requirements of the particular installation.

Referring to FIG. 2, there is shown a junction box assembly 14 in accordance with a preferred embodiment of the present invention. The junction box assembly 14 provides a convenient and secure means for routing electrical cables (not shown) into the passenger compartment of the aircraft. The junction box assembly 14 consists of an enclosure 16, cover 18, cable strain support 20, and gasket 22.

Referring to FIGS. 3 and 4, the enclosure 16 is preferably box shaped and consists of four sidewalls 24 and 26, and a bottom wall 28. Multiple cutouts (one example of which is shown in FIG. 3 at reference 29) can be manufactured into the sidewalls 24 and 26 of the enclosure 16 to accommodate various cable connector configurations depending on the requirements of the particular application. Four tabs 30, which are preferably an integral part of the enclosure 16, extend from the top edge 32 of the enclosure 16, with one tab 30 being positioned adjacent to each of the four sidewalls 24 and 26. The tabs 30 are oriented perpendicular to their respective sidewall. The tabs 30 provide a means for attaching the enclosure 16 to a bottom surface 34 of the floor panel 10 (see FIG. 2).

Continuing to refer to FIG. 4, an "L"-shaped strain relief support bracket 36 is fixedly attached to the bottom wall 28 of the enclosure 16. Surface 38 of the support bracket 36 Will preferably rest in the same plane as sidewall 26. The support bracket 36 provides a means for securing the cables (not shown) to the junction box 14, via clips or other suitable means, in order to prevent the cable connections within the junction box 14 from becoming accidentally separated.

The skilled artisan will appreciate that the enclosure 16 can be manufactured through a variety of methods. For example, in one preferred embodiment, the enclosure 16 is produced by performing a series of conventional bending operations on an initially flat sheet of formable material, such as, for example, sheet steel or sheet aluminum. Referring to FIG. 5, there is shown a planar piece of formable metal representing a cutout 38 used to form the box shaped enclosure 16 shown in FIGS. 3 and 4. The dashed lines indicate bend lines. The bottom wall 28, the sidewalls 24 and 26, and the mounting tabs 30 are all formed once the cutout 38 is folded along the dashed fold lines. Sections 42 provide a set of tabs for connecting the sides walls 24 and 26 together. The connecting tabs 42 are suitably affixed, such as by welding or riveting, to the adjacent sidewall 24 (see FIG. 3).

In a preferred embodiment of the present invention, threaded screws are used to attach the enclosure 16 to the bottom surface 34 of floor panel 10. Two mounting holes 44 are provided in each of the four attachment tabs 30 through which a total of eight screws 46 are inserted (see FIG. 2, in which only one screw is shown for clarity). Each screw 46 is attached to a corresponding threaded insert 48 (see FIG. 6) that is embedded into the floor panel 10 in such a manner that an outer edge 50 of the installed insert 48 is approximately flush with the bottom surface 34 of the floor panel. Although epoxy 52 is preferably used to secure the threaded inserts 48 to the floor panel 10, the skilled artisan will recognize that other equally suitable means exist for securing the threaded inserts to the floor panel.

Referring now to FIG. 8, the access opening 12 is shown from the bottom surface 34 of floor panel 10. The threaded inserts 48 are preferably positioned symmetrically around the centerline of the access opening 12 so that the centerline of the opening in enclosure 16 will substantially coincide with the centerline of the access opening 12 when the enclosure 16 is attached to the floor panel 10.

Referring back to FIG. 2, the gasket 22 is positioned around the circumference of the access opening 12 and in immediate contact with a top surface 54 of floor panel 10. The gasket 22 is preferably made of rubber, but other materials having similar functional sealing characteristics may also be used. Four mounting holes 56, one located near each of the four corners of gasket 22, are provided for attaching the gasket 22 to the floor panel 10.

Referring further to FIG. 2, the cable stain support 20 is, positioned on top of and immediately adjacent to the previously installed gasket 22. The dimensions of the strain support 20 will, for the most part, preferably match the dimensions of the gasket 22. The only significant difference being that the strain support 20 has an integral tab 57 that extends downward from one of the interior edges 58 of the strain support 20. The tab 57 provides a means for securing the cables (not shown) to the junction box 14, via clips or other suitable means, in order to prevent the cable connections in the junction box 14 from becoming accidentally separated. Four mounting holes 60 (only three holes being visible in the figure), one located near each of the four corners of the strain support 20, are provided for attaching the strain support 20 to the floor panel 10. The pattern of the mounting holes 60 approximately matches the pattern of the mounting holes 56 of gasket 22.

Once the cable connections in the enclosure 16 are completed, the cover 18 is placed over the enclosure 16 opening to substantially seal off the interior of the junction box 14 from the passenger compartment. The cover 18 is placed immediately adjacent to and in contact with the strain support 20. Four mounting holes 62, one located near each of the four corners of the cover 18, are provided for attaching the cover 18 to the floor panel 10. The pattern of the mounting holes 62 approximately matches the pattern of the mounting holes 56 of gasket 22.

The cover 18 has a raised area 64 that is offset from the rest of the cover by a predetermined distance 66. The offset 66 is preferably only slightly larger than the maximum diameter of the cables exiting the junction box 14. The offset 66 preferably extends far enough back from the edge 68 of the cover 18 to avoid having to bend the cables too sharply while routing the cables out of the junction box 14. The width 70 of the opening created by the offset 66 can vary depending on the number of cables exiting the junction box 14, with the maximum width being determined by the placement of the attachment screw holes 62.

Figure 7:
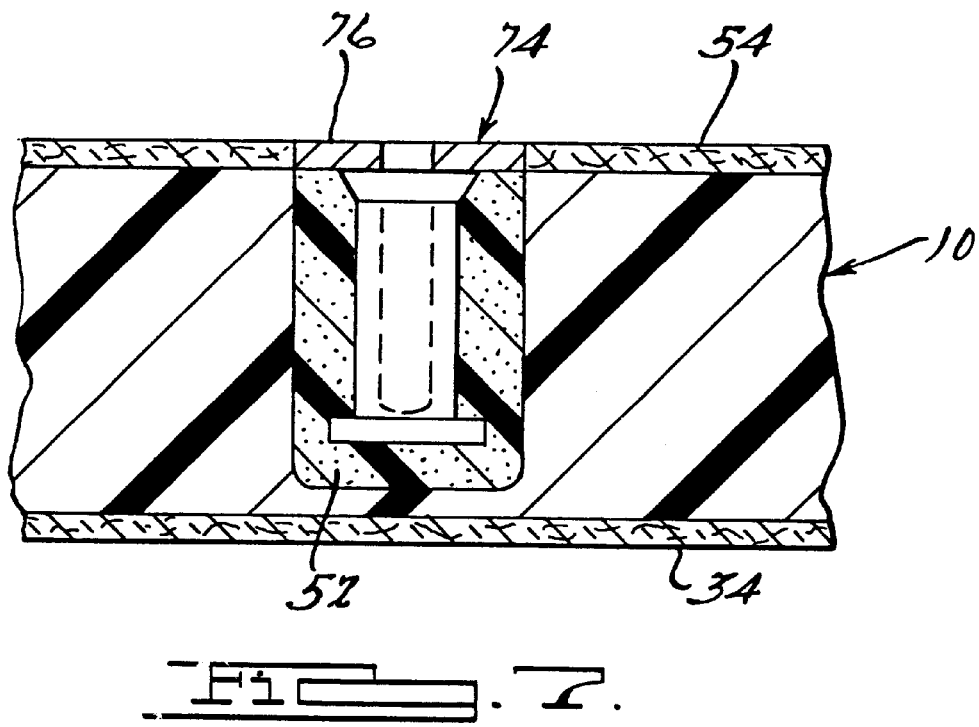
FIG. 7 is a cross section of the passenger compartment floor panel showing a threaded insert used to attach a cover, cable strain support and gasket to the top of the floor panel.

Referring further to FIG. 2, the gasket 22, strain support 20, and cover 18, are fixedly attached to the top surface 54 of the floor panel 10 using four screws 72 (for clarity only one screw is shown). Each screw 72 attaches to a corresponding threaded insert 74 (see FIG. 7) that is embedded into the floor panel 10 in such a manner that an outer edge 76 of the installed insert 74 is approximately flush with the top surface 54 of the floor panel 10. Although epoxy 52 is preferably used to secure the threaded inserts 74 to the floor panel 10, it will be appreciated that other equally suitable means exist for securing the threaded inserts 74 to the floor panel 10.

Referring now to FIG. 9, the access opening 12 is shown from the top surface 54 of floor panel 10. The threaded inserts 74 are preferably positioned around the circumference of the access opening 12 in such a manner that when the gasket 22, strain support 20, and cover 18 are attached to the top of the floor panel 10, the centerline of each will substantially coincide with the centerline of the access opening 12.

The cable junction box of the present invention provides a convenient and secure means for routing cables into the passenger compartment of a wide body aircraft. Furthermore, the junction box can be readily adapted to accommodate various installations, thus eliminating or minimizing many of the problems associated with routing cables through the passenger compartment floor of an aircraft.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A junction box for use on a mobile platform enabling routing of an electrical cable through a panel, the junction box comprised of:

an enclosure having at least one wall; and a cover that partially encloses an interior of said enclosure, wherein said cover includes an upper surface having an offset portion projecting perpendicular to said at least one wall and away from said interior of said enclosure, said offset portion forming a low profile access opening, relative to said panel, through which a cable extending generally parallel to said panel can be routed into the interior of said enclosure.

2. The junction box of claim 1, further comprising a cable strain support member interposed between said enclosure and said cover.

3. The junction box of claim 2, wherein said cable strain support member is further comprised of a tab adapted to facilitate securing cables thereto.

4. The junction box of claim 1, further comprising a gasket interposed between said enclosure and said cover.

5. The junction box of claim 1, wherein said enclosure has at least one mounting tab for attaching said enclosure to an interior member of said aircraft.

6. The junction box of claim 1, wherein said wall has at least one opening for attaching a cable connector.

7. The junction box of claim 1, further comprising a strain relief support bracket secured to said wall.

8. A junction box for routing electrical cables through a passenger compartment floor panel of an aircraft, comprised of:
- a generally boxed shaped enclosure having a plurality of walls;
- a cover that partially encloses the interior of said enclosure;
- a cable strain support interposed between said cover and said enclosure; and
- a gasket interposed between said cable strain support and said enclosure;
- wherein said cover has an offset-portion perpendicular to said plurality of walls, and forming a low profile opening closely adjacent said floor panel through which said cables may extend.

9. The junction box of claim 8, wherein said plurality of walls is comprised of:
- a generally rectangular shaped first sidewall;
- a generally rectangular shaped second sidewall that is attached to said first sidewall;
- a generally rectangular shaped third sidewall that is attached to said second sidewall;
- a generally rectangular shaped fourth sidewall that is attached to said third side wall;
- a generally rectangular shaped bottom that is attached to at least one of said first, second, third or fourth sidewalls.

10. The junction box of claim 9, further comprising at least one mounting tab attached to at least one of said first, second, third or fourth sidewalls and adapted for attaching said enclosure to a bottom surface of said passenger compartment floor panel.

11. A junction box for routing electrical cables, comprising;
- a generally box shaped enclosure having a plurality of sidewalls adapted to be secured on a first side of a planar wall portion;
- a cover that partially encloses the interior said enclosure, said cover being adapted to sit generally flush against said planar wall portion;
- said cover having a-projection projecting outwardly away from an interior area of said enclosure, said projection forming an access opening extending parallel to said cover and generally perpendicular to said sidewalls that enables electrical cables routed along said planar wall to enter said access opening while being maintained closely adjacent said planar wall portions.

12. The junction box claim 11, further comprising a strain relief element to provide a strain relief to said cables housed within said junction box.

* * * * *